(12) United States Patent
Nishi

(10) Patent No.: US 6,469,970 B2
(45) Date of Patent: Oct. 22, 2002

(54) DISK-REPRODUCING APPARATUS WITH INTEGRALLY FORMED DISK TABLE AND ROTOR

(75) Inventor: Takahisa Nishi, Honjo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/880,057

(22) Filed: Jun. 14, 2001

(65) Prior Publication Data

US 2001/0030931 A1 Oct. 18, 2001

Related U.S. Application Data

(63) Continuation of application No. 09/015,504, filed on Jan. 29, 1998, now abandoned.

(30) Foreign Application Priority Data

Jan. 30, 1997 (JP) .............................................. 9-016209

(51) Int. Cl.$^7$ .............................................. G11B 33/12
(52) U.S. Cl. .................................................... 369/75.2
(58) Field of Search ............................... 369/75.1, 75.2; 360/99.02, 99.06

(56) References Cited

U.S. PATENT DOCUMENTS

| | | | |
|---|---|---|---|
| 4,914,647 A | 4/1990 | Ono et al. ................. | 369/77.2 |
| 5,193,480 A | 3/1993 | Christiaens ................. | 369/258 |
| 5,555,223 A | 9/1996 | Yano et al. ................. | 369/270 |
| 5,586,106 A | 12/1996 | Chiou et al. ................. | 369/270 |
| 5,808,996 A | 9/1998 | Aoyama ..................... | 369/77.1 |
| 5,862,116 A * | 1/1999 | Watanabe et al. ......... | 360/99.06 |
| 5,883,870 A | 3/1999 | Akiba et al. ................ | 369/77.1 |
| 5,956,315 A * | 9/1999 | Sawai et al. ................ | 369/270 |
| 5,995,480 A | 11/1999 | Naka et al. ................. | 369/258 |

FOREIGN PATENT DOCUMENTS

| | | | |
|---|---|---|---|
| EP | 0 650 166 A1 | 4/1995 | |
| EP | 0 698 882 A2 | 2/1996 | |
| JP | 08190572 * | 7/1996 | ......... G11B/17/028 |
| WO | 94/24671 | 10/1994 | |
| WO | 97/24721 | 7/1997 | |

* cited by examiner

Primary Examiner—George J. Letscher
(74) Attorney, Agent, or Firm—Pillsbury Winthrop LLP

(57) ABSTRACT

This disk-reproducing apparatus has a feature that a rotor 24 of a disk motor, a table 32 and a centering part 33 of a disk-chucking section 31 are formed into one body. Therefore, its overall height can be made smaller than a disk drive mechanism, which is formed by assembling separately produced parts such as a rotor, a table and a centering part. And, it can be assembled with high accuracy. Besides, by additionally integrating a motor shaft with the rotor, the table and the centering part, a disk drive mechanism can be provided with less unevenness of assembling accuracy, such as unevenness of a press-fitting length of the motor shaft into a shaft hole of the disk-chucking section.

6 Claims, 4 Drawing Sheets

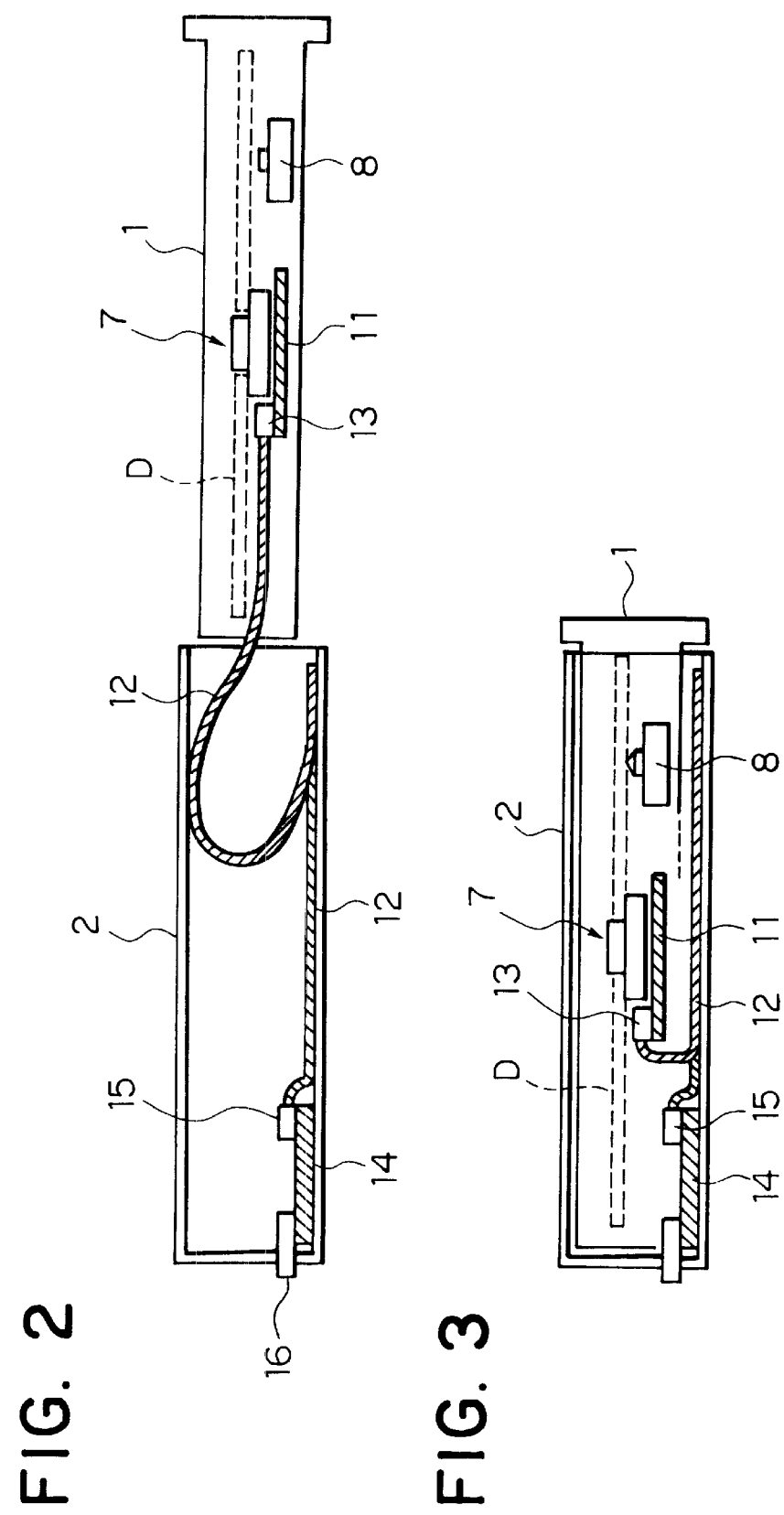

DISK-REPRODUCING APPARATUS WITH INTEGRALLY FORMED DISK TABLE AND ROTOR

CROSS-REFERENCE TO RELATED APPLICATIONS

This application is a Continuation of U.S. patent application Ser. No. 09/015,504, filed Jan. 29, 1998, now abandoned, which is based upon and claims benefit of priority of Japanese Patent Application No. Hei-9-016209, filed on Jan. 30, 1998, the contents of which are incorporated herein by reference.

BACKGROUND OF THE INVENTION

1. Field of the Invention

The invention relates to a disk-reproducing apparatus for reproducing data on a disk such as CD-ROM and DVD (digital video disk).

2. Description of the Related Art

The disk-reproducing apparatus has a driving mechanism to spin a disk at high speed. This disk drive mechanism comprises a motor section and a disk-chucking section for centering and chucking the disk. The motor section includes a shaft, a bearing, a plurality of electromagnetic coils, a rotor and a plurality of magnets fixed to the rotor. The disk-chucking section includes a table on which the disk is placed, a centering part which mates with the center hole of the disk to make centering of the disk, and a means for chucking the disk with the table.

The table and the centering part of the disk-chucking section have a shaft hole, in which one end of the shaft protruding from the rotor of the motor section is press-fitted. Thus, the motor section is connected with the disk-chucking section.

In developing a disk-reproducing apparatus, which is mounted on a compact information-processing device such as a [note] notebook type personal computer, it is necessary to make the overall thickness of the disk drive mechanism small. To produce a thin disk drive mechanism, vigorous efforts have been made vigorously to reduce the thickness of various parts.

But, with the existing part fabricating technology, it is hard to produce small parts with high accuracy. If the parts which configure the disk drive mechanism are not fabricated accurately, a phenomenon of vertically vibrating a disk (face-vibrating phenomenon), which is caused while the disk is being spun, becomes extreme, resulting in lowered performance of the optical pickup to follow tracks. And, the rotor supported by the shaft and the disk-chucking section have an increased instability as the shaft hole in which the shaft is press-fitted becomes shorter. Under such conditions, the limit for reducing the overall thickness of the disk drive mechanism by reducing the thickness of the respective parts is almost reached.

Besides, such a disk drive mechanism tends to have unevenness in assembling the respective parts accurately. Especially, if the press fitting of the shaft into the shaft hole of the disk-chucking section is variable in length, respective disk-reproducing apparatuses have a different length from the disk to the lens of the optical pickup. Thus, the ability to follow the tracks with the optical pickup is adversely affected.

SUMMARY OF THE INVENTION

It is an object of the invention to provide a disk-reproducing apparatus, which is produced with ease, with high dimensional accuracy and made thin.

It is another object of the invention to provide a disk reproducing apparatus, which does not generate heavy face disk vibration and which excels in operational reliability such as the ability to follow tracks with an optical pickup.

It is also another object of the invention to provide a disk-reproducing apparatus having a highly accurate flat disk-mounting table.

To achieve the above objects, the disk-reproducing apparatus of the invention is configured as described below. Specifically, the invention relates to a disk-reproducing apparatus having a rotor of a disk motor and a disk-chucking section formed into one body, which comprises a base which supports a bearing and electromagnetic coils; a shaft which is rotatably supported by the bearing; a rotor which is connected with the shaft and has a disk-mounting face on which a disk is placed; magnets which are fixed to the rotor; and a disk-chucking section which is formed integral with the rotor to make centering and chucking of the disk which is placed on the disk-mounting face of the rotor.

The disk-reproducing apparatus of the invention has the rotor having a face, on which a disk is placed, and the disk-chucking section formed into one body instead of separate parts, so that its overall height can be made small, and a high dimensional accuracy can be obtained. Thus, a thin disk-reproducing apparatus, which does not cause heavy face disk vibrations, can be provided.

And, the disk-reproducing apparatus of the invention has the rotor, which is formed of a first portion to which the magnets are fixed and a second portion, which is formed integral with the table, and the first portion being connected with the second portion. Thus, the respective parts can be made to have a simple shape, and higher dimensional accuracy can be obtained.

To achieve the objects described above, the disk-reproducing apparatus according to another aspect of the invention is configured as described below. Specifically, the invention relates to a disk-reproducing apparatus having a rotor of a disk motor and a disk-chucking section formed into one body, which comprises a base which supports a bearing and electromagnetic coils; a shaft which is rotatably supported by the bearing; a rotor which is formed integral with the shaft and has a disk-mounting face on which a disk is placed; magnets which are fixed to the rotor; and a disk-chucking section which is formed integral with the rotor and makes centering and chucking the disk placed on the disk-mounting face of the rotor.

Since the rotor having the face on which the disk is placed, the disk-chucking section and the shaft are formed into one body, the disk-reproducing apparatus of the invention does not require the extra step of press fitting the shaft. Therefore, the disk drive mechanism be more readily assembled readily and a length between the lens of an optical pickup and a disk can be made constant in every device. In addition, the disk-reproducing apparatus thus provided has excellent optical pickup.

BRIEF DESCRIPTION OF THE DRAWINGS

FIG. 2 is a sectional view showing a disk-reproducing apparatus with a movable part extracted from a cabinet;

FIG. 3 is a sectional view showing a disk-reproducing apparatus having the movable part retracted into the cabinet;

DETAILED DESCRIPTION OF THE INVENTION

The present invention applies to a compact information-processing device such as a notebook-type personal computer or the like.

Figure 1:
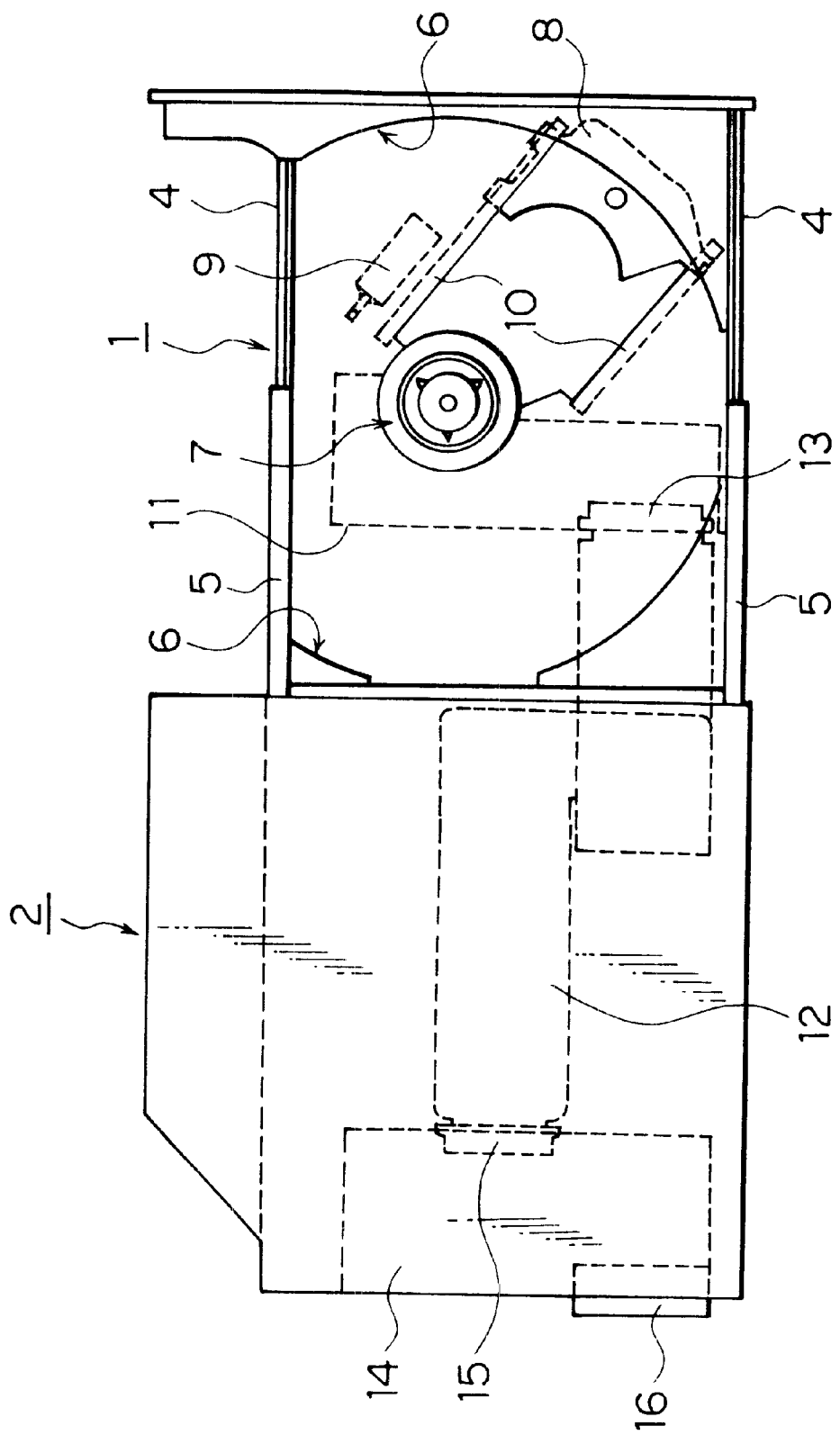
FIG. 1 is a plan view showing the entire structure of a disk-reproducing apparatus of a first embodiment of the invention.

In a first embodiment, shown in FIG. 1, this disk-reproducing apparatus comprises mainly a movable part 1 which has a mechanism for driving and reproducing a disk and a cabinet 2 which accommodates the movable part 1. The movable part 1 can be slid into or out of the cabinet 2.

The mechanism of moving the movable part 1 comprises a pair of guide rails (not shown) mounted on both inner side walls of the cabinet 2, guide projections 4 formed on both sides of the movable part 1, and slide rails 5 for securing the connection of the guide projections 4 of the movable part 1 with the guide rails of the cabinet 2 in a range that the movable part 1 can be moved. Accordingly, the movable part 1 is slid in a direction parallel to the surface of a disk (not shown) placed on the movable part 1 so to be slid into or out of the cabinet 2.

The movable part 1 has a recess 6 in which a disk is placed, a disk drive mechanism 7 which chucks to drive the disk positioned in the recess 6, an optical pickup 8 which irradiates an optical beam to record tracks of the disk being driven by the disk drive mechanism 7 and converts the reflections of the beam on the disk into electrical signals to read information recorded on the disk, and a pickup feeding mechanism which moves the optical pickup 8 in a radial direction of the disk. This pickup feeding mechanism comprises a motor 9 as power source of this mechanism, a guide section 10 which guides the movement of the optical pickup 8, and a power transmission mechanism (not shown) such as a gear which changes the power of the motor 9 to the moving operation of the optical pickup 8.

The movable part 1 has a circuit board 11, which is electrically connected to the mechanism for driving and reproducing the disk. This circuit board 11 has, for example, a disk motor for driving the disk, a connector 13 for electrically connecting with a circuit board 14 mounted in the cabinet 2 by means of a flexible cable 12, and other various types of electronic parts.

The circuit board 14 mounted on the cabinet 2 has semiconductor devices such as a microcomputer and memories for controlling the disk-reproducing apparatus, a connector 15 for electrically connecting with the circuit board 11 of the movable part 1 through the flexible cable 12, a connector 16 for electrically connecting with a host computer, and other electronic parts.

Thus, the circuit board 11 of the movable part 1 and the circuit board 14 of the cabinet 2 are electrically connected mutually through the flexible cable 12. Transmission and reception of various type signals between the circuit board 11 of the movable part 1 and the circuit board 14 of the cabinet 2 and feeding of power from the cabinet 2 to the movable part 1 are performed through respective signal lines formed on the flexible cable 12.

As shown in FIG. 2 and FIG. 3, the movable part 1 can be slid in or out of the cabinet 2. The flexible cable 12 includes a fold portion, a fixed portion fixed on the inner bottom surface of the cabinet 2 and being arranged between the connector 15 and the fold portion, and a non-fixed portion being arranged between the connector 13 and the fold portion. The non-fixed portion, as illustrated in FIGS. 2 and 3, has approximately the same length as the fixed portion. The non-fixed portion of the flexible cable 12 changes its form according to where the movable part 1 is positioned so to respond flexibly to a distance between the connector 13 of the circuit board 11 and the connector 15 of the circuit board 14.

Now, the disk drive mechanism 7 of the disk-reproducing apparatus will be described in detail.

Figure 4:
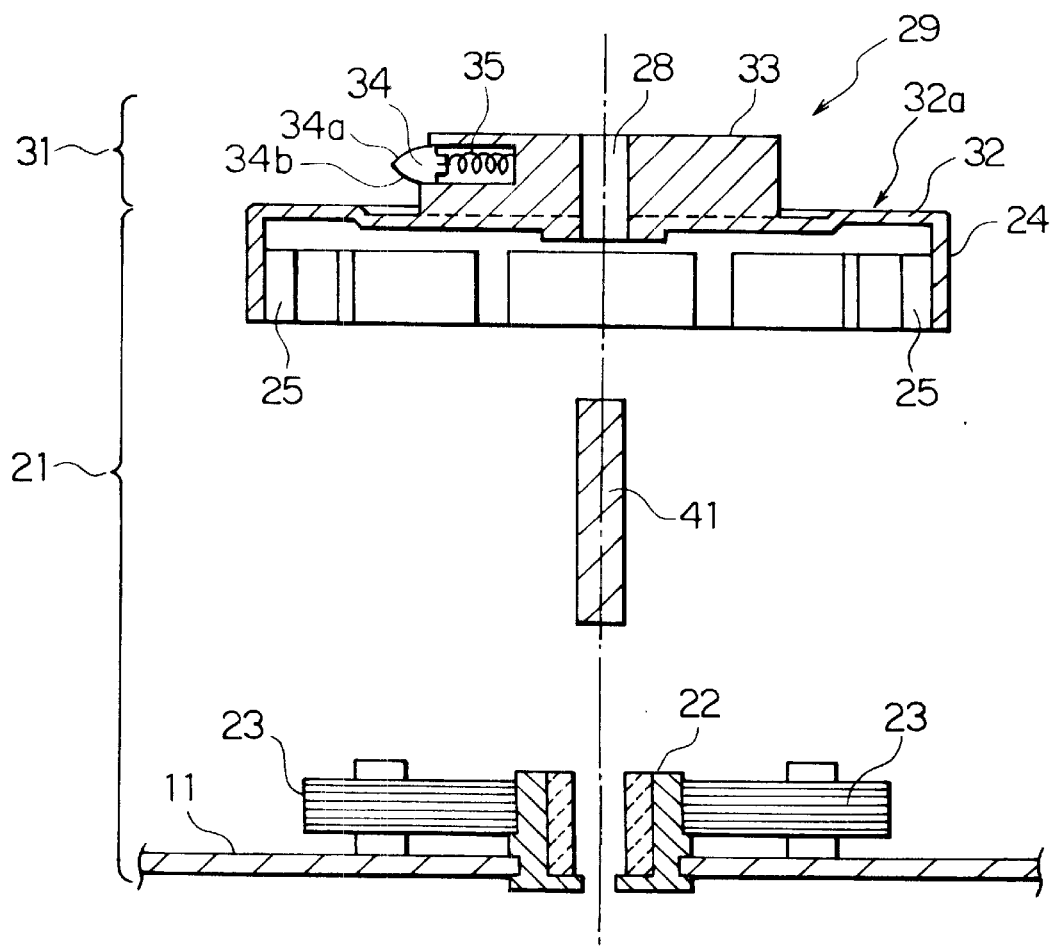
FIG. 4 is an exploded sectional view showing the structure of a disk drive mechanism of the disk-reproducing apparatus of FIG. 1.
Figure 5:
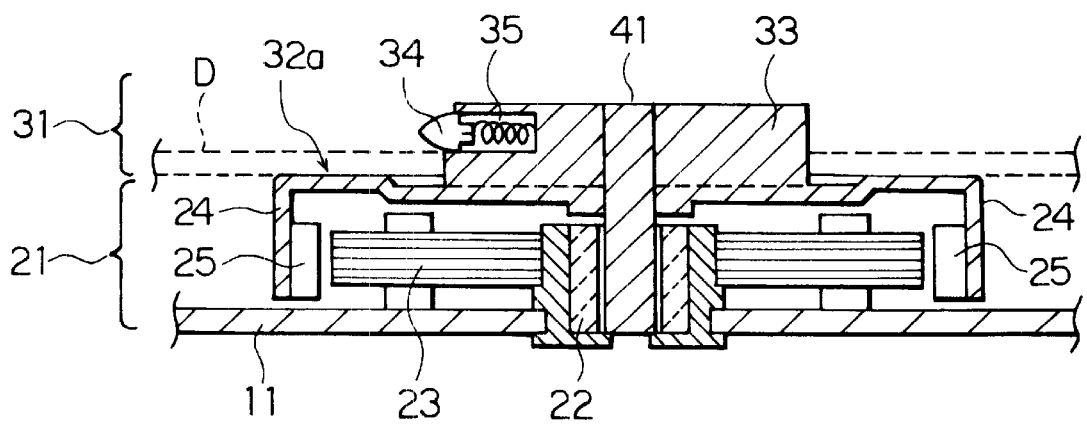
FIG. 5 is a sectional view showing the structure of the disk drive mechanism shown in FIG. 5.

As shown in FIG. 4 and FIG. 5, the disk drive mechanism 7 comprises mainly a motor section 21 and a disk-chucking section 31 which chucks a disk D.

The disk-chucking section 31 comprises a table 32 on which the disk D is placed, a centering part 33 which is mated with a center hole of the disk D to effect centering (operating to align the rotating center of the motor with that of the disk) of the disk D, and a chip 34 with a spring 35 for chucking the disk D with the table surface.

The chip 34 and the spring 35 are fitted to the centering part 33. The leading end of the chip 34 is protruded from the periphery surface of the centering part 33. The chip 34 is held by the centering part 33 so to be movable in a forward and backward direction with respect to the peripheral surface of the centering part 33 and pushed by the spring 35 in a radial direction from the center of the centering part 33. And, tapered faces 34a, 34b are formed on upper and lower parts of the chip 34 protruded from the centering part 33.

The table 32 has a disk-mounting face 32a perpendicular to an axial direction of a motor shaft 41. The table 32 is formed integrally with a rotor 24 of the motor section 21. In other words, the table 32 also serves as a cover for the top face of the rotor 24. Therefore, the top face of the rotor 24 may be regarded as the disk-mounting face 32a of the table 32.

Operation of chucking the disk D by the disk-chucking section Ad 31 will be described. To fit the center hole of the disk D to the centering part 33, the chip 34, which receives the inner wall of the center hole of the disk D with its supper tapered face 43a, is moved back toward the center of the centering part 33. When the disk D is fitted to the centering part 33 to reach a certain degree, a contact point between the inner wall of the center hole of the disk D and the chip 34 is switched from the upper tapered face 34a to the lower tapered face 34b. Then, the disk D is moved toward the table 32 by the effects of the force of the spring 35 and the lower tapered face 34. Finally, the disk D is held between the lowered tapered face 34b of the chip 34 and the disk-mounting face 32a of the table 32.

The chip 34 and the spring 35 are provided at a plurality of locations (e.g., three locations) of the centering part 33 so that the disk D can be held stably on the disk drive mechanism.

The disk motor section 21 comprises the motor shaft 41, a bearing 22 which rotatably supports the motor shaft 41, a plurality of electromagnetic coils 23, the rotor 24 which is formed integral with the disk-chucking section 31, and a plurality of magnets 25 which are mounted on the rotor 24. The bearing 22 and the respective electromagnetic coils 23 are fixed to the circuit board 11 of the movable part 1.

The rotor 24 is a cylindrical member with its bottom open. The plurality of magnets 25 are fixed to the inner wall of the cylinder section of the rotor 24 so to generate a magnetic interaction with the magnetic fields generated around the respective electrified electromagnetic coils 23. The rotor 24 is driven to rotate by the magnetic interaction produced by these electromagnetic coils 23 and the magnets 25.

The disk-reproducing apparatus of this embodiment has a feature that the rotor 24 of the motor, the table 32 and the centering part 33 are formed in one body. Specifically, the table 32 is integral with the lower part of the centering part 33 and also integral with the upper part of the rotor 24 of the motor. A unit 29 thus formed into one body can be produced by cutting metal or the like. In addition, the integral unit 29 has a shaft hole 28 in which the motor shaft 41 is press-fitted.

This disk drive mechanism is assembled as follows. First, one end of the motor shaft 41 is press-fitted into the shaft hole 28 of the integral unit 29, which has the chip 34 and the spring 35 fitted into the centering part 33. The shaft hole 28 may be adhered to the motor shaft 41 with an adhesive agent. Then, the motor shaft 41 with its one end press-fitted into the integral unit 29 has the other end inserted into the bearing 22 which is fixed onto the circuit board 11 together with the respective electromagnetic coils 23. Thus, the disk drive mechanism can be assembled by a very simple procedure.

As described above, since the disk-reproducing apparatus of this embodiment has the rotor 24, the table 32 and the centering part 33 formed into one body, its disk drive mechanism can be made thinner than those currently in use. Specifically, since the table 32 and the rotor 24 are formed into one body, a height from the circuit board 11 to the disk-mounting face 32a can be made smaller than when they are provided as separate parts.

Since the disk-reproducing apparatus of the first embodiment has the rotor 24, the table 32 and the centering part 33 formed into one body, the disk drive mechanism having the same thickness as the disk-reproducing apparatus can be formed with a higher dimensional accuracy as compared with a case of forming it by assembling a rotor, a table and a centering independently. Therefore, a highly reliable disk-reproducing apparatus, which does not generate heavy face disk vibrations, can be produced efficiently.

As described above, in the disk-reproducing apparatus of the first embodiment, the number of parts of the disk drive mechanism can be reduced, assembling can be facilitated, and a space for the rotor 24, the table 32 and the centering part 33 can be made compact. Therefore, the disk-reproducing apparatus can be made thin and inexpensive.

Figure 6:
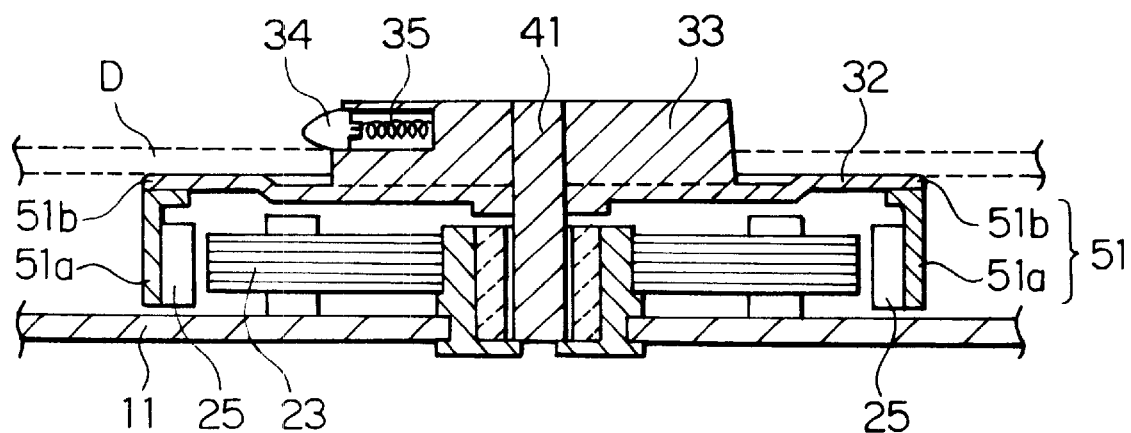
FIG. 6 is a sectional view showing the structure of a disk drive mechanism of the disk-reproducing apparatus of a second embodiment of the invention.

As shown in FIG. 6, a rotor 51 of a disk drive mechanism in the disk-reproducing apparatus of the second embodiment comprises a cylinder 51a to which magnets 25 are fixed and a thin disk 51b which is formed integral with a centering part 33 and a table 32. The cylinder 51a and the disk 51b of the rotor 51 are independently produced parts. The cylinder 51a of the rotor 51 is adhered to the disk 51b, which is formed integral with the centering part 33 and the table 32, with an adhesive agent or another bonding means when the disk drive mechanism is assembled. Other structures are the same as those in the disk drive mechanism shown in FIG. 3 and FIG. 4.

Thus, the cylinder 51a of the rotor 51 is produced separate from the integral unit which comprises the rotor 51, the table 32 and the centering part 33, so that the integral unit can be made into a simple shape. Thus, the integral unit can be produced with ease and its fabrication accuracy can be improved.

Figure 7:
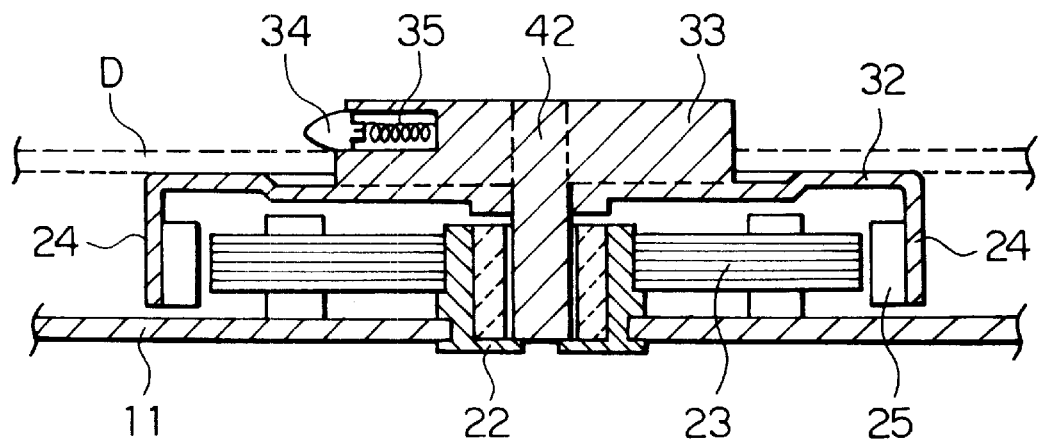
FIG. 7 is a sectional view showing the structure of a disk drive mechanism of the disk-reproducing apparatus of a third embodiment of the invention.

In a third embodiment of the present invention, as shown in FIG. 7, the disk drive mechanism of the disk-reproducing apparatus of this embodiment has a feature that a rotor 24, a table 32, a centering part 33 and a motor shaft 42 are formed into one body.

By forming the rotor 24, the table 32, the centering part 33 and the motor shaft 42 into one body, the existing press-fitting of the motor shaft into the shaft hole of the disk-chucking section becomes unnecessary, and unevenness of a press-fitting length is prevented. Thus, the disk drive mechanism can be assembled with ease, and a length between the lens of an optical pickup and a disk can be made constant in every disk-reproducing apparatus. In addition, the disk-reproducing apparatus provided has excellent optical pickup in terms of following the record tracks.

By forming the rotor 24, the table 32, the centering 33 and the motor shaft 42 into one body, the disk drive mechanism which has an axis of the motor shaft 42 aligned with those of the rotor 24, the table 32 and the centering part 33 with high accuracy can be produced readily. Accordingly, disk face vibrations can be better prevented. And, the optical pickup can maintain good performance in terms of following the record tracks.

In the respective embodiments described above, the bearing which rotatably holds the motor shaft can be a ball bearing. In order to more effectively prevent disk face vibrations, it is desirable to use a bearing having a smaller clearance from the motor shaft. The disk can be further prevented from face vibrations by using a bearing with a small clearance from both the motor shaft and the disk drive mechanism of the invention in combination.

What is claimed is:

1. A disk drive apparatus comprising:

a cabinet having an inner bottom surface;

a movable part movably connected to the cabinet between an extracted position for exposing the movable part from the cabinet and a retracted position for storing the movable part in the cabinet;

a motor section mounted on the movable part and including:
  a first circuit board supporting a bearing and electromagnetic coils,
  a shaft rotatably supported by the bearing,
  a table part connected to the shaft and having a mounting surface for mounting a disk on the mounting surface, the mounting surface being substantially parallel to the inner bottom surface, and
  a rotor being formed integrally with the table part and having a magnet attached to an inner wall and arranged to face the electromagnetic coils;

a centering part for centering a disk, the centering part being mounted on the table part;

a chip and a spring fitted to the centering part, the chip and the spring being arranged to chuck the disk on the mounting surface, the chip being movable in a horizontal direction to the mounting surface when the disk is chucked;

a second circuit board mounted on the inner bottom surface; and a flexible cable electrically connecting the first and the second circuit boards, having a first connector connecting the flexible cable and the first circuit board, a fold portion, a second connector connecting the flexible cable and the second circuit board, a fixed portion fixed on the inner bottom surface and being arranged between the second connector and the fold portion, and a non-fixed portion being arranged between the first connector and the fold portion and having approximately the same length as the length of the fixed portion.

2. The disk drive apparatus according to claim 1, wherein the table part is formed integrally with the shaft.

3. The disk drive apparatus according to claim 1, wherein the centering part is formed integrally with the table part.

4. The disk drive apparatus according to claim 3, wherein the table part is formed integrally with the shaft.

5. A disk apparatus comprising:

a cabinet having an inner bottom surface;

a movable part slidably connected to the cabinet between an extracted position for exposing the movable part from the cabinet and a retracted position for storing the movable part in the cabinet, the movable part being slidable along to the inner bottom surface;

a motor mounted on the movable part and including:
  a first circuit board having a first board surface being substantially parallel to the inner bottom surface and supporting a bearing and electromagnetic coils on the first board surface,
  a shaft rotatably supported by the bearing,
  a table part connected to the shaft and having a mounting surface for mounting a disk on the mounting surface, the mounting surface being substantially parallel to the inner bottom surface, and
  a rotor being formed integrally with the table part and having a magnet arranged to face the electromagnetic coils;

a centering part for centering a disk, the centering part being mounted on the table part;

means for chucking the disk on the mounting surface;

a second circuit board mounted on the inner bottom surface; and a flexible cable electrically connecting the first and the second circuit boards, having a first connector connecting the flexible cable and the first circuit board, a fold portion, a second connector connecting the flexible cable and the second circuit board, a fixed portion fixed on the inner bottom surface and being arranged between the second connector and the fold portion, and a non-fixed portion being arranged between the first connector and the fold portion and having approximately the same length as the length of the fixed portion.

6. A disk apparatus comprising:

a cabinet having an inner bottom surface;

a movable part slidably connected to the cabinet between an extracted position for exposing the movable part from the cabinet and a retracted position for storing the movable part in the cabinet, the movable part being slidable along to the inner bottom surface;

a motor mounted on the movable part and including:
  a first circuit board having a first board surface being substantially parallel to the inner bottom surface and supporting a bearing and electromagnetic coils on the first board surface,
  a shaft rotatably supported by the bearing,
  a table part connected to the shaft and having a mounting surface for mounting a disk on the mounting surface, the mounting surface being substantially parallel to the inner bottom surface, and
  a rotor being formed integrally with the table part and having a magnet arranged to face the electromagnetic coils;

a centering part for centering a disk, the centering part being mounted on the table part;

a second circuit board mounted on the inner bottom surface; and a flexible cable electrically connecting the first and the second circuit boards, having a first connector connecting the flexible cable and the first circuit board, a fold portion, a second connector connecting the flexible cable and the second circuit board, a fixed portion fixed on the inner bottom surface and being arranged between the second connector and the fold portion, and a non-fixed portion being arranged between the first connector and the fold portion and having approximately the same length as the length of the fixed portion.

* * * * *